INVENTOR
Anton Rappl,
BY
Beau, Brooks, Buckley & Beau.
ATTORNEYS

Patented Feb. 24, 1942

2,274,276

UNITED STATES PATENT OFFICE 2,274,276

VALVE

Anton Rappl, Eggertsville, N. Y., assignor to
Trico Products Corporation, Buffalo, N. Y.

Application June 25, 1938, Serial No. 215,897

1 Claim. (Cl. 251—119)

This invention relates to an improvement in valves and particularly to such valves as involve the use of a relatively flexible valve element.

An aim of the present invention is to provide a pressure responsive device wherein the pressure responsive means may be so constructed as to be extremely sensitive to pressure differentials and yet be so arranged and supported as to have sufficient strength and rigidity to insure satisfactory and continued operation of the device.

By way of exemplification I have illustrated my invention in connection with a pressure responsive system which may be embodied in the vacuum system commonly employed for operating automotive accessories from the sub-atmospheric pressure obtaining in the intake manifold of vehicle engines. One application of my invention may be found where a mechanical pump is provided for augmenting the vacuum of the intake manifold and the preferred form of the present invention will be described in connection with such application.

The several structural and functional advantages resulting from employment of the principles of this invention will appear from a consideration of the ensuing specification and claim.

Figure 1:
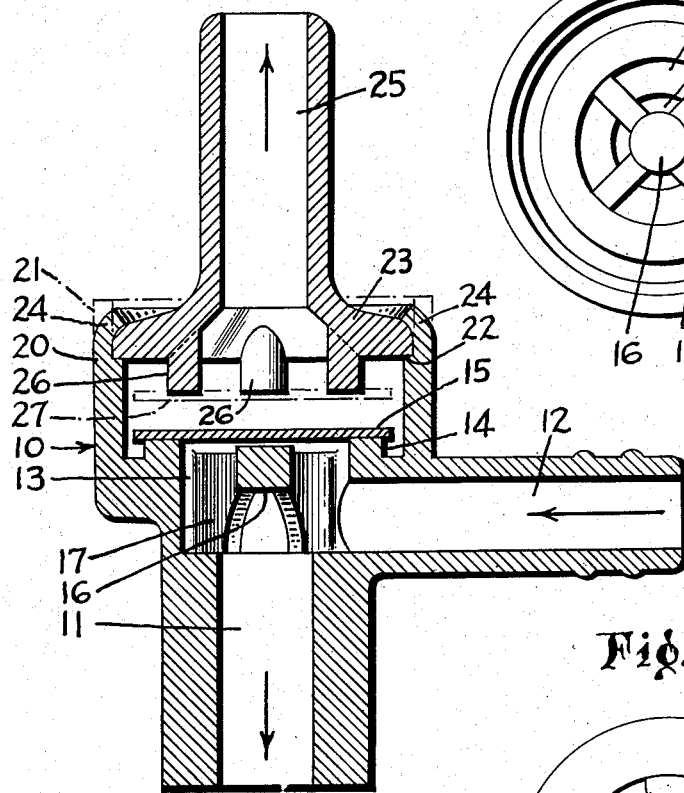
Fig. 1 is an enlarged cross-sectional elevational view of a pressure responsive device exemplifying the principles of the present invention.
Figure 2:
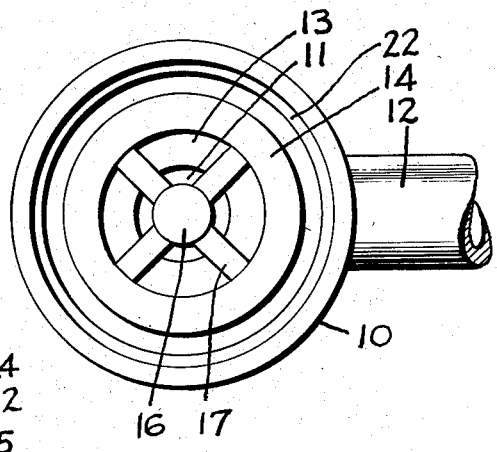
Fig. 2 is an enlarged top plan view of the body portion of the device with the cover member removed.
Figure 3:
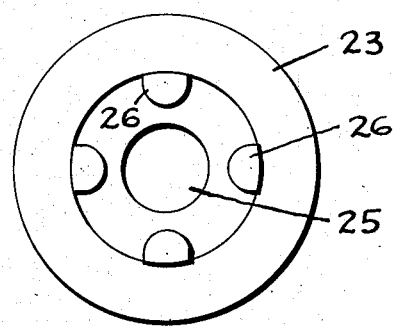
Fig. 3 is an enlarged bottom plan view of the cover member of the device.

Referring to Fig. 1, the numeral 10 denotes a casing element having a pair of communicating passages 11 and 12 extending therefrom. The passages 11 and 12 are in constant communication and in the specific application referred to above the passage 11 may be connected for communication with a mechanical vacuum pump and the passage 12 would then be connected to a vacuum accessory motor for operating the same.

The continuous passage 11, 12 has adjacent thereto and in communication therewith a valved chamber 13 formed by a surrounding annular flat valve seat 14. The valve seat is normally sealed from the space thereabove by a light weight relatively flexible valve element 15 which is held in intimate contact with the valve seat 14 by the atmospheric pressure above the valve seat, or at any rate, by the relatively higher pressure prevailing above the valve than the pressure prevailing in the passage 11, 12.

It is desired to construct the thin discoidal valve element 15 in such manner that it will be extremely sensitive to prevailing pressure differentials between the passage 11, 12 and the space above the valve 15, and to this end I use a valve element 15 which is fabricated from a relatively soft, impervious, non-metallic material.

To permit the use of such relatively flexible material for the valve disc I provide special means for giving additional support to the valve element 15 whenever the fluid pressure acting thereagainst is sufficient to cause appreciable flexure of the valve element. As depicted in the drawing, this additional supporting means may take the form of a hub or boss 16 which is supported approximately centrally of the chamber 13 by radiating arms 17 which extend to the wall of the chamber 13 and form a spider for supporting the hub 16.

It will be noted that the working surface of the hub 16, its upper surface, is spaced somewhat below the level of the valve seat surface 14. This is done so as to insure firm seating of the valve 15 on the valve seat 14 at all points around its circumference without interference with such firm seating. If an attempt were made to have the supporting face of the hub 16 in accurate alinement with the seating face of the valve, any inaccuracy in manufacture which resulted in the supporting face of the hub 16 being slightly above the valve face 14 or any part thereof would result in interference with proper seating of the valve upon its face 14.

In any event, even the accurate alinement of the valve supporting face of the hub 16 with the surface of the valve seat 14 would serve only to cause the hub 16 to bear a part of the atmospheric load acting upon the upper surface of the valve 15 and thereby reduce the force acting to hold the valve in properly seated relation on the valve seat 14 even when the pressure so acting on the valve is at a minimum. The clearance which is provided is kept within such limits as to prevent undue downward flexure of the central valve 15, as seen in Fig. 1.

In the illustrated form, the casing 10 has an upwardly extending annular wall portion 20 which provides space for vertical movement of the valve 15. The wall 20 is normally formed with a vertically extending rim as indicated in dot and dash lines at 21 in Fig. 1. The rim 21 is thinner than the remainder of the wall portion 20 to provide a ledge 22 for receiving and seating a cover element 23. After the cover element is introduced into the opening at the upper side of the wall 20 and seated against the ledge 22, the rim 21 is swaged or peened inwardly so as to engage and retain the cover member 23, all as indicated at 24 in Fig. 1.

The cover member 23 has an upwardly extending reduced conduit portion 25 which in the particular application of the invention hereinbefore referred to is connected to the intake manifold of an internal combustion engine. The operation of the device in this particular application of the invention will be described later.

At its underface the cover member 23 is provided with a plurality of protuberances 26 which extend downwardly toward the valve seat 14 and positively limit the upward movement of the valve 15 away from the valve seat 14, while at the same time permitting, when the valve is in the dotted line position 27, free egress of air from the valve chamber 13 around the valve and between the protuberances 26, then through the conduit portion 25.

It will be clear from the structure described that whenever the pressure prevailing in the passage 11—12 is less than that prevailing within the conduit portion 25, fluid pressure will urge the valve disc 15 to seating position as illustrated in full lines in Fig. 1. In such position the connection to the intake manifold of the internal combustion engine by means of the conduit 25 plays no part in the operation of the remainder of the system. A suction pump (not shown) is connected to the passage 11 and withdraws air from a suction operated accessory (not shown) connected to the conduit 12.

Whenever the pressure in the passage 11—12 exceeds the pressure in the conduit 25, either because of failure of the pump to withdraw sufficient air or because of an increasing vacuum in the intake manifold of the internal combustion engine, the valve 15 is lifted from its seat and assumes the position indicated in dotted lines at 27 in Fig. 1. Flow of air will then be from the accessory motor to the intake manifold by way of the conduits 12 and 25. At such time as the pressure in the intake manifold and, therefore, in the conduit 25 again exceeds the pressure below the valve element 15, the valve automatically closes.

I claim:

A check valve comprising a casing having a fluid passage therethrough and a second fluid passage extending laterally from the first fluid passage, an annular valve seat in said first fluid passage adjacent but out of the line of the juncture of said first and second fluid passages, said valve seat being directed away from said juncture, a flat relatively lightweight, disc valve for engaging said annular seat and adapted to be lifted therefrom under the influence of differential fluid pressure to open a circular valve passage through said annular valve seat, said first-mentioned passage being enlarged adjacent said valve seat and in a direction away from said second passage to provide a cupped valve housing portion terminating in an open end, a cover member secured over such open end to complete the valve housing, said cover member having spaced protuberances at its inner side to limit opening movement of said valve and a conduit portion leading away from the body of said cover member and having an opening formed therein in communication with the interior of the valve housing, and means disposed within said valve passage and having a flat valve supporting face extending parallel to and spaced inwardly of said valve seat whereby the valve will not normally contact the valve supporting face, said face being disposed centrally with respect to said valve seat to permit fluid flow when the valve is in an open position, the disposition of the valve seat, the valve housing and the valve support being such as to avoid interference with direct flow through the second passage and the portion of the first passage which is in direct communication therewith when the valve is closed.

ANTON RAPPL.